R. A. GOELKEL.
EYEGLASS CASE AND CLEANING DEVICE.
APPLICATION FILED JULY 12, 1919.

1,339,330.

Patented May 4, 1920.

WITNESSES

INVENTOR
RINALDO A GOELKEL
BY
ATTORNEYS

UNITED STATES PATENT OFFICE.

RINALDO A. GOELKEL, OF NEW YORK, N. Y.

EYEGLASS CASE AND CLEANING DEVICE.

1,339,330.   Specification of Letters Patent.   Patented May 4, 1920.

Application filed July 12, 1919. Serial No. 310,326.

*To all whom it may concern:*

Be it known that I, RINALDO A. GOELKEL, a citizen of the Republic of Colombia, and a resident of the city of New York, borough of Manhattan, in the county and State of New York, have invented a new and Improved Eyeless Case and Cleaning Device, of which the following is a full, clear, and exact description.

This invention relates to a combined eyeglass case and cleaning device and has for an object an improved structure whereby substantially any sized or shaped eyeglasses may have the lenses thereof wiped while still in the case.

Another object of the invention is to provide a case with a member having a rotary movement which is transmitted to the glasses in the case so as to move the same over suitable wiping surfaces provided in the case.

Figure 1:
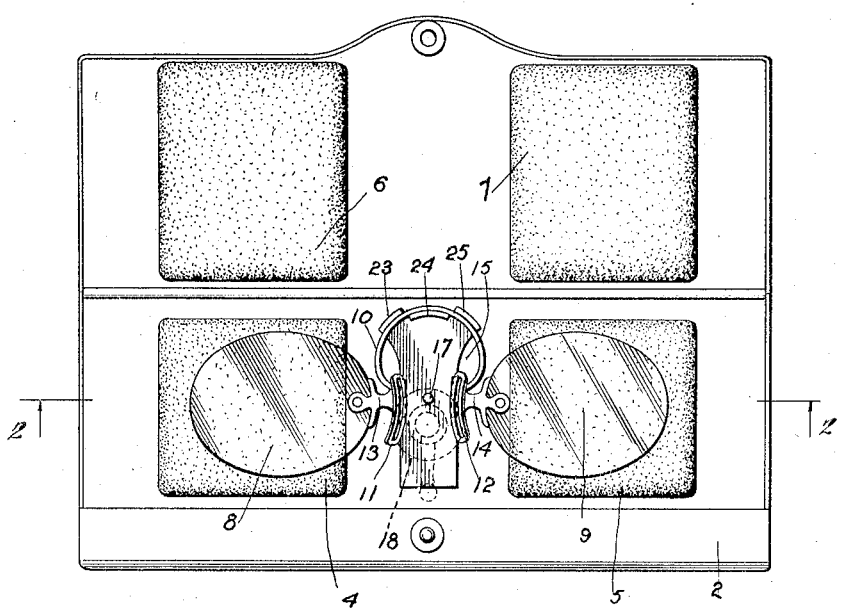
Figure 1 is a plan view of an eyeglass case embodying the invention, same being shown open with a pair of eyeglasses in place.
Figure 2:
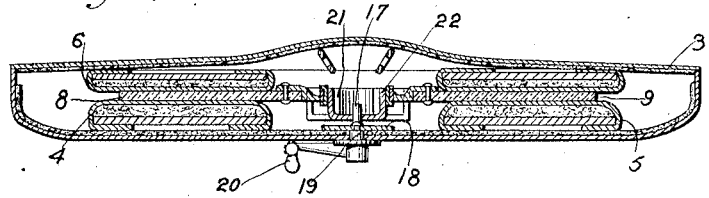
Fig. 2 is a section through the case shown in Fig. 1, same being taken substantially on line 2—2.
Figure 3:
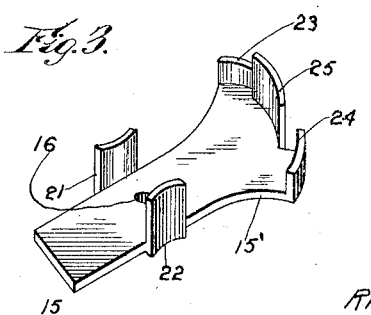
Fig. 3 is an enlarged detail fragmentary view of the glass moving member shown in Figs. 1 and 2.

Referring to the accompanying drawings by numerals 1 indicates the case which is provided with a body 2 and a lid 3, the particular construction of these parts forming no part of the present invention, as they are all disclosed in my former Patent No. 1,277,210, issued August 27, 1918.

The body 2 is provided with pads 4 and 5 while the cover 3 is provided with pads 6 and 7 coacting with pads 4 and 5 for wiping the lenses 8 and 9. These lenses are of the usual construction connected together by a spring bridge 10 of any desired structure which has nose grips 11 and 12 associated therewith, which nose grips merge into posts 13 and 14, said posts being secured in any suitable manner to the lenses 8 and 9.

Arranged substantially centrally of the body 2 is an eyeglass turning or moving member 15 which is provided with an aperture 16 for receiving a pin 17, which pin is rigidly secured to a rotating disk 18. The rotating disk 18 is rotated by a shaft 19 to which a suitable crank 20 is secured whereby the plate 18 and associated parts may be moved from the exterior of the case while the case is closed. The pin 17 is offset from the center of the disk 18 so that it travels in a circle and therefore moves the aperture 16 in a circle and the remaining parts of member 15 correspondingly. The member 15 is formed with a flat body 15' having upstanding ears 21 and 22 which are designed to be gripped by the nose grips 11 and 12, while the upstanding lugs 23, 24 and 25 act as retaining and guiding means for the spring 10. It will be observed that the lug 25 is offset from the associated lugs so that it will fit on one side of the spring 10 while the remaining lugs fit on the opposite side and thereby hold the parts in proper place.

During the operation of the device when the crank 20 is turned member 15 will have a tendency to turn but for the fact that the lenses 8 and 9 will bear against the walls of the casing and will limit the turning action to merely a back and forth gyratory movement. This partial rotary or gyratory movement results in a wiping or rubbing of the opposite faces of the lenses by the various pads 4 to 7 inclusive. This arrangement of movable member 15 also permits glasses of different sizes to be cleaned without adjustment of any of the parts.

What I claim is:

1. A combined eyeglass case and cleaner comprising an inclosing casing, a plurality of oppositely facing pads arranged in the casing, a movable member arranged between the respective sets of pads for gripping and moving the eyeglasses so that the lenses will be wiped by said pads, said movable member comprising upstanding lugs adapted to be engaged by the grips of the eyeglasses, and a power receiving body, a pin extending into said body, and means extending to the exterior of the casing for moving said pin in a circle.

2. A combined eyeglass case and cleaner comprising an inclosing casing, cleaning pads carried by the case, a movable member arranged substantially centrally of the casing, said movable member comprising a body having an aperture therein and a plurality of upstanding lugs, one of said lugs being offset from the remaining lugs whereby the nose piece of a pair of eyeglasses may fit therebetween, and a manually operated power member extending into said aperture for moving said movable member and the eyeglasses carried thereby whereby the lenses of the eyeglasses will be rubbed against said pads for cleaning.

3. A combined eyeglass case and cleaner comprising an inclosing casing, a plurality of pads arranged in said casing, a movable member arranged centrally of the casing, said movable member comprising a body having an opening therein, a pair of upstanding ears, a plurality of lugs arranged at one end, the center lug being offset from the remaining lugs whereby the bridge piece of a pair of eyeglasses may fit therebetween and the grips of the eyeglasses may grip said upstanding ears, and a manually operated member extending into said aperture for moving the movable member and the eyeglasses carried thereby so that the lenses thereof will rub against said pads and be wiped thereby.

RINALDO A. GOELKEL.